United States Patent [19]
Azad et al.

[11] Patent Number: 5,730,811
[45] Date of Patent: Mar. 24, 1998

[54] CAVITY DUMPED LASER SHOCK PEENING PROCESS

[75] Inventors: Farzin Homayoun Azad, Clifton Park; Josef Robert Unternahrer, Niskayuna, both of N.Y.

[73] Assignee: General Electric Company, Schenectady, N.Y.

[21] Appl. No.: 576,822

[22] Filed: Dec. 21, 1995

[51] Int. Cl.$^6$ .................................................. C21D 1/04
[52] U.S. Cl. ........................ 148/565; 148/714; 148/903; 219/121.61
[58] Field of Search ........................ 148/565, 714, 148/903; 219/121.61, 121.66, 121.85

[56] References Cited

U.S. PATENT DOCUMENTS

| | | | |
|---|---|---|---|
| 3,747,019 | 7/1973 | Koechner et al. | 331/945 |
| 5,127,019 | 6/1992 | Epstein et al. | 372/108 |
| 5,131,957 | 7/1992 | Epstein et al. | 48/565 |

OTHER PUBLICATIONS

Koechner, "Solid-State Laser Engineering", 3rd Edition, 1992, pp.: cover, 435–441,476–481.

Fairand et al., "Laser Generation of High-Amplitude Stress Waves in Materials", J. Appl. Phys. vol. 50, No. 3, Mar. 1979, pp.: 1497–1502.

Vaccari, "Laser Shocking Extends Fatigue Life", American Machinist, Jul. 1992, pp.: 62–64.

Fairand et al., "Effect of Water and Paint Coatings on the Magnitude of Laser–Generated Shocks", Optics Communications, vol. 18, No. 4, Sep. 1976, pp.: 588–591.

Clauer et al., "The Effects of Laser Shock Processing on the Fatigue Properties of 2024–T3 Aluminum", Lasers in Materials Processing, Jan. 1983, pp.: cover, 7–22.

Fabbro et al., "Physical Study of Laser–Produced Plasma in Confined Geometry", J. Appl. Phys., vol. 68, No. 2, Jul. 1990, pp.: 775–784.

*Primary Examiner*—Sikyin Ip
*Attorney, Agent, or Firm*—Tyler Maddry; Donald S. Ingraham

[57] ABSTRACT

A laser shock peening apparatus includes a cavity dumping laser oscillator including in optical serial alignment a first mirror, a Pockels cell, a polarizer, a laser rod, and a second mirror defining a cavity having an optical length between the mirrors. The laser rod is optically pumped to generate a laser beam in the cavity, and the Pockels cell has selective wave retardation to allow the beam to oscillate between the mirrors and increase energy therein, followed in turn by dumping the beam into a laser amplifier. The laser amplifier directs the amplified pulse at a target for laser shock peening thereof. The cavity length is selected to develop a substantially square-wave laser pulse for temporally shaping the resulting pressure pulse at the target.

17 Claims, 1 Drawing Sheet

5,730,811

CAVITY DUMPED LASER SHOCK PEENING PROCESS

BACKGROUND OF THE INVENTION

The present invention relates generally to shot peening, and, more specifically, to laser shock peening.

In conventional shot peening, small balls are fired against the surface of an metallic workpiece or target to create plastic deformation thereat and a corresponding residual compressive stress. The residual compressive stress improves the useful fatigue life of the workpiece when it is used in a high stress application.

Laser shock peening is being developed to provide improvements in forming the residual compressive stress in the workpiece surface. A laser is operated in a pulse mode for directing laser pulses against the workpiece surface, which typically has a light absorbing ablative coating confined by a thin layer of water for example. The laser pulse vaporizes the coating in a small explosion which is confined by the water thusly developing an instantaneous pressure pulse which plastically deforms the workpiece surface to generate residual compressive stress therein. Although the ablative coating is preferred, laser shock peening may also be accomplished without the coating.

It is known to sharpen the leading edge of each pulse using a metal foil or a phase conjugation reflector for improving the laser shock peening process. In the foil method, the foil initially blocks the transmission of the laser pulse until the foil is vaporized, with the remainder of the pulse passing through the foil virtually unattenuated. The foil is therefore transported at a suitable speed to continually replenish the foil for each succeeding laser pulse. In this method, however, some of the pulse energy is wasted in vaporizing the foil, and the resulting foil vapor or dust can adversely affect propagation of the laser pulses. The phase conjugation reflector has a certain threshold-intensity below which reflectivity is zero and above which reflectivity is significant. The threshold must be reached at a proper level during the leading edge of the laser pulse for shortening or sharpening the rise time thereof. However, dielectric breakdown competes with the phase conjugation reflector process which is likely to occur before the threshold is reached thusly degrading performance in this method.

It is therefore desirable to improve the laser shock peening process by not only sharpening the rise time of the pulse leading edge, but also improving the overall temporal shape of the laser pulse itself in a relatively simple and low-loss method.

SUMMARY OF THE INVENTION

A laser shock peening apparatus includes a cavity dumping laser oscillator including in optical serial alignment a first mirror, a Pockels cell, a polarizer, a laser rod, and a second mirror defining a cavity having an optical length between the mirrors. The laser rod is optically pumped to generate a laser beam in the cavity, and the Pockels cell has selective wave retardation to allow the beam to oscillate between the mirrors and increase energy therein, followed in turn by dumping the beam into a laser amplifier. The laser amplifier directs the amplified pulse at a target for laser shock peening thereof. The cavity length is selected to develop a substantially square-wave laser pulse for temporally shaping the resulting pressure pulse at the target.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figures 1, 2:
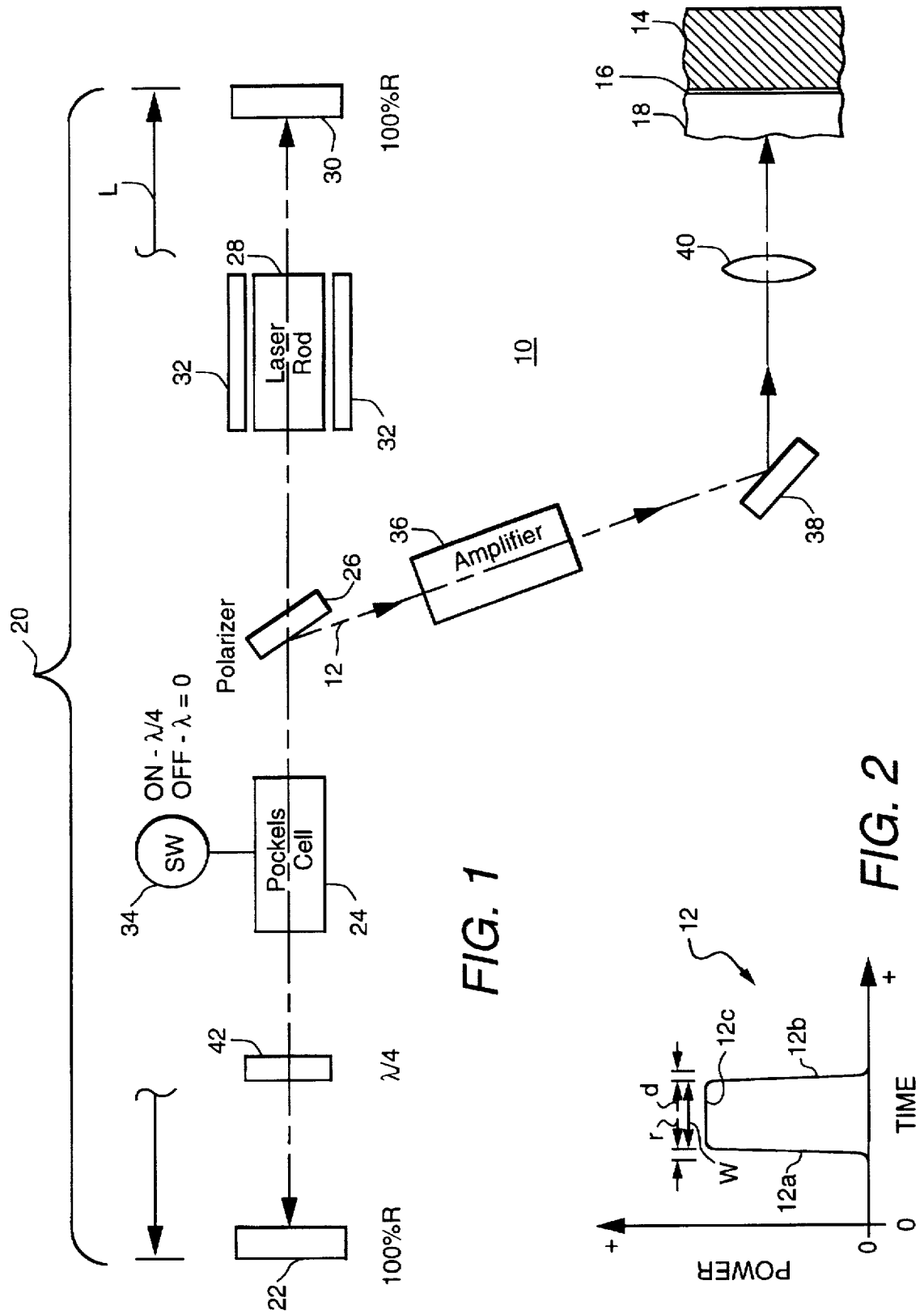
FIG. 1 is a schematic representation of a cavity dumped laser shock peening apparatus in accordance with one embodiment of the present invention.
FIG. 2 is a graph illustrating a preferred square-wave shape of laser beam pulses emitted from the apparatus illustrated in FIG. 1.

Illustrated schematically in FIG. 1 is a laser shock peening apparatus 10 in accordance with an exemplary embodiment of the present invention. The apparatus 10 is effective for discharging a pulsed laser beam 12 against a metallic workpiece or target 14 for developing residual compressive stress at and below the surface thereof. The target 14 may take any suitable form and may include a conventional ablative coating 16 in the form of black paint for example. A thin film of water 18 is suitably provided over the coating 16 for confining the exploding vapor resulting from impingement of the laser beam 12 against the coating 16.

Accordingly, a pressure pulse develops against the surface of the target 14 causing the propagation of shock or stress wave into the target material, and plastically deforming the regions at and near the surface to retain a residual compressive stress thereat. A stream of laser pulses is suitably scanned across the surface of the target 14 for obtaining substantially uniform laser shock peening thereof.

The apparatus 10 includes a Q-switched cavity dumping laser oscillator or resonator 20 in which the laser beam 12 is generated. The oscillator 20 is specifically configured for use in effecting laser shock peening. The oscillator 20 is effective for generating a series of laser beam pulses each having an inherently sharp leading edge thereof. In accordance with a preferred embodiment, each laser pulse is preferably substantially square-wave for temporally shaping the pressure pulse developed at the target 14 for improving the laser shock peening process. FIG. 2 illustrates an exemplary pulse of the laser beam 12 which includes a leading edge 12a having a sharp or relatively fast rise time designated r, a trailing edge 12b having a relatively fast decay time designated d, and a generally flat peak 12c having a time duration width W measured at the peak or full maximum power between the leading and trailing edges 12a,b.

The pulses of the laser beam 12 may be temporally shaped by suitably configuring the oscillator 20 in accordance with a preferred embodiment of the present invention as shown in FIG. 1. The oscillator 20 includes in optical serial alignment a first reflecting mirror 22 at one end, a Pockels cell 24, a prism or polarizer 26, a laser rod 28, and a second reflecting mirror 30 disposed at an opposite end of the oscillator 20. The components of the oscillator 20 are conventional but configured in accordance with the present invention for controlling the temporal shape of the laser beam pulses emitted therefrom. The oscillator 20 has substantially 100% reflectivity (R) between the two end mirrors 22, 30. Conventional means in the exemplary form of flashlamps 32 adjoin the laser rod 28 for conventionally optically pumping the laser rod to develop the laser beam 12. The laser rod 28 may have any suitable form such as Neodymium (Nd) glass laser gain medium.

Switching means 34, in the form of a conventional driver, are operatively joined to the Pockels cell 24 for switching the Pockels cell 24 for polarization rotation by selective wave retardation of the beam 12 to control operation of the oscillator 20. The oscillator 20 between the end reflecting mirrors 22, 30 defines a cavity therebetween having an optical length L that controls the round trip transit time of the oscillating laser beam which determines the pulse width W. The rise time r of the pulses produced by the oscillator 20 is controlled by the switching time of the Pockels cell 24.

The Pockels driver 34 operates by providing a bias voltage across the Pockels cell 24 for selectively controlling the wave retardation thereof. After the rod 12 is initially pumped, the driver 34 provides a bias voltage on the cell 24 in a regeneration or high-Q mode to effect a suitable wave retardation so that the developing beam oscillates past the polarizer 26 and between the end mirrors 22, 30 for increasing energy in the beam by regeneration. When the oscillating beam reaches peak power, the driver 34 suitably reduces the bias on the cell 24 to change the retardation for diverting the beam at the polarizer 26 from reaching the second mirror 30 to discharge the energy stored in the oscillator 20 in the laser beam pulse in a dumping mode.

One or more conventional laser amplifiers 36 are preferably disposed in optical alignment with the polarizer 26 for receiving the dumped laser pulse therefrom and amplifying the pulse and suitably directing it at the target 14 to develop the pressure pulse thereagainst for laser shock peening thereof. One or more turning mirrors 38, and a suitable focusing lens 40 are disposed in optical alignment between the amplifier 36 and the target 14 as desired.

In this way, the laser beam pulse is generated in the oscillator 20 and has a sharp leading edge provided by switching the Pockels cell 24. The amplifier 36 suitably amplifies the sharp pulse which is directed as an amplified pulse against the target 14 for laser shock peening thereof. The cycle is repeated for generating a train of the desired temporally shaped laser beam pulses which are suitably scanned across the target 14 for providing peening thereof. In this arrangement, conventional foil or a phase conjugation reflector are not needed or used for suitably sharpening the leading edge of the laser beam pulse. The Pockels cell 24 provides a suitably sharp leading edge which has a rise time r of about 2–3 nanoseconds (ns). The Pockels cell 24 also effects a relatively sharp trailing edge having a corresponding decay time d also about 2–3 ns.

Furthermore, the cavity length L is preferably selected to develop a substantial square-wave laser pulse for temporally shaping the pressure pulse at the target 14. In one embodiment, the cavity length L is about 2 meters which results in a round trip transit time or pulse width W of about 13 ns.

The cavity dumping oscillator 20 makes possible not only sharpening of the leading edge 12a of the laser beam pulse, but also sharpening of the trailing edge 12b, as well as maintaining a substantially high pulse peak or maximum 12c therebetween. The sharp leading edge 12a does not result in the loss of energy in each laser pulse as occurs using conventional foil sharpening. And, analysis indicates that a slowly decaying pulse trailing edge causes a portion of the pulse energy to be wasted since it is at relatively low power and therefore is ineffective in developing pressure in the vaporized coating 16.

In accordance with the present invention, it is also desirable to maximize the limited amount of energy in each laser pulse at relatively high pulse power to more effectively transfer the energy into the developing pressure pulse at the target 14. The ideal square-wave laser pulse would instantaneously reach maximum power for a finite duration or width W and instantaneously decay to maximize the energy transfer into the pressure pulse at the target 14. The oscillator 20 configured in accordance with the exemplary embodiment illustrated in FIG. 1 provides a simple arrangement for temporally shaping the laser pulses for optimizing the resulting pressure pulses at the target 14.

In the exemplary configuration of the square-wave laser pulse illustrated in FIG. 2, the sharp leading and trailing edges 12a,b allow the width W of the pulse therebetween to be fairly uniform from low to maximum power. In a typical Q-switch laser pulse, the resulting pulse is typically triangular or Gaussian wherein the pulse width is typically measured at the half maximum power level and is typically referred to as full width half maximum (FWHM) duration or width. In these typical conventional pulses, the energy in the pulse is spread out over time, with only a reduced portion of the pulse being effecting for generating the pressure pulse at the target. In accordance with the present invention, the laser pulse is temporally shaped to maximize the available energy in each laser pulse in a substantially square-wave configuration for maximizing the effectiveness of the pressure pulse. In the exemplary embodiment illustrated in FIG. 2, the pulse width at peak power, as well as half maximum, is substantially longer in duration than both the leading edge rise time r and the trailing edge decay time d.

In the exemplary embodiment illustrated in FIG. 1, the single Pockels cell 24 is used both for Q-switch initiation as well as for cavity dumping, or two Pockels cells could be used for these two functions. The rise time r of each laser pulse produced by the oscillator 20 is given by the switching time of the Pockels cell 24 which is a few nanoseconds, e.g., 2–3 ns. The exemplary two meter long oscillator cavity produces a pulse of about 13 ns duration or width W. And, the oscillator 20 is operated for discharging one pulse per cycle of operation for maximizing the energy in the dumped pulse therefrom.

In the preferred embodiment illustrated in FIG. 1, the cavity or oscillator 20 is continuously linear or straight between the first and second mirrors 22, 30 which substantially simplifies the alignment of the components thereof for improving maintainability during operation. In an alternate embodiment, the cavity 20 may be oblique between the polarizer 26 and the two end mirrors 22,30, which increases alignment difficulty. However, in this angled configuration, the higher efficiency in the reflection mode of the polarizer 26, compared to its transmission mode, results in higher efficiency of the oscillator.

In the FIG. 1 embodiment, the amplifier 36 is aligned off-axis or obliquely with the linear optical path of the oscillator 20. In this arrangement, it is preferable to include a conventional quarter-wave plate 42 disposed in optical alignment between the first mirror 22 and the Pockels cell 24 to simplify the Pockels cell driver 34. And, the driver 34 is configured to bias the Pockels cell 24 with a suitable bias voltage for obtaining quarter-wave retardation in the regeneration mode.

During operation of the cavity 20 when the gain therein is highest, the voltage on the Pockels cell 24 is switched to the quarter-wave value so that circulating power in the oscillator starts to build up. In this regeneration mode, the driver 34 is therefore on for effecting quarter wave retardation in the cell 24 which is additive with the quarter wave retardation in the wave plate 42. As the beam travels through the cell 24 and the plate 42 and is reflected and returned by the first mirror 22 it undergoes a full wave retardation (360°) so that it passes through the polarizer 26 to the second mirror 30 and returns for repeating the circulating path for building energy. When the energy reaches its peak value, the Pockels cell 24 is switched to a suitable off position for placing the oscillator 20 in the dumping mode for extracting energy from the oscillator 20, which is directed through the amplifier 36 to the target 14. Without the quarter-wave plate 42, the Pockets cell 24 would be operated oppositely.

In one embodiment, the driver 34 is configured to bias the cell 24 to a zero voltage in the dumping mode which effects zero wave retardation in the cell 24 to dump substantially all the energy stored in the cavity. With the Pockels cell 24 being off, zero wave retardation is effected thereby and the only retardation is effected by the wave plate 42, which in the reflected trip therethrough effects only half wave retardation (180°) which causes the polarized beam to deflect off the polarizer 26 and through the amplifier 36. In this way, maximum power may be developed in each individual laser pulse per cycle and dumped to the amplifier 36 for impinging the target 14. The corresponding pulse width W is therefore controlled by the cavity round trip transit time as the beam oscillates over the cavity length L.

If a longer pulse duration or width is desired, the oscillator 20 may be operated so that it does not return to zero reflectivity after the buildup time of the circulating power, but returns instead to a finite reflectivity. This is simply accomplished by configuring the driver 34 to bias the Pockels cell 24 to a suitable non-zero voltage in the dumping mode for maintaining a finite wave retardation to prevent complete dumping of the energy stored in the cavity, and thereby increase the pulse width W. In the above example, the cell 24 is switched to a zero voltage bias to reduce the wave retardation to zero to dump all the energy, whereas to increase the pulse width, the Pockels cell 24 is switched to a non-zero voltage bias to merely reduce the wave retardation to a non-zero value, and partially dump energy in the oscillator 20.

For example, a round trip transit time of about 10 ns and a cavity dump reflectivity of 50% result in a corresponding pulse width of about 20 ns. The reflectivity of the oscillator 20 is controlled by the voltage left on the Pockels cell 24 during the dumping process. As long as the total round trip energy losses are dominated by the polarizer 26, no significant reduction in extraction efficiency is expected from this mode of operation.

Accordingly, the cavity dump oscillator 20 provides a simple and efficient apparatus for circulating the laser beam in the oscillator 20 by wave retardation of the beam in the Pockels cell 24 to build or pump energy into the beam to reach a peak power. And, by simply switching the cell 24 to reduce the wave retardation, the laser beam is dumped from the oscillator 20 with not only a suitably sharp leading edge pulse, but also a sharp trailing edge and a suitably long width for maximizing the effecting laser pulse energy to improve the resulting pressure pulse at the target 14.

The oscillator 20 may be varied in configuration and operation as desired for correspondingly adjusting the temporal shape of the individual laser beam pulses, and thereby the temporal shape of the resulting pressure pulses developed at the target 14. Conventional optimization of the various components may be conducted for obtaining the optimal temporal shape of the laser beam pulses for maximizing efficiency of the laser shock peening process.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A method for laser shock peening a target for developing residual compressive stress at a surface thereof, the method comprising the steps of:

generating a laser beam pulse from a cavity dumping oscillator having a sharp leading edge by circulating a laser beam in said oscillator to pump energy in the laser beam to a peak, and switching a Pockels cell to change a degree of wave retardation of the laser beam to dump the laser beam out of the oscillator as the laser beam pulse;

selecting a switching time of the Pockels cell to control the leading edge of the laser beam pulse; and directing said laser beam pulse against said target to develop a pressure pulse at the target for laser shock peening of the target, wherein the laser beam pulse is directed against the target without reducing a duration of the leading edge of the laser beam pulse.

2. A method according to claim 1 further comprising temporally shaping said laser pulse in said oscillator to develop a substantially square wave laser pulse.

3. A method according to claim 2 further comprising temporally shaping said laser pulse to develop leading and trailing edges, and a width therebetween, with said width being longer in duration than said leading edge.

4. A method according to claim 3 wherein said pulse width is longer in duration than said trailing edge.

5. The method of claim 1, wherein the Pockels cell is switched in less than or equal to about 3 nanoseconds.

6. A method according to claim 1 wherein said Pockels cell is switched to a zero voltage bias to reduce said wave retardation to zero and dump substantially all energy in said oscillator.

7. A method according to claim 1 wherein said Pockels cell is switched to a non-zero voltage bias to reduce said wave retardation to a non-zero value, and partially dump energy in said oscillator.

8. A method according to claim 7 further comprising oscillating said laser beam in a continuously optically linear path in said oscillator.

9. A method according to claim 8 further comprising amplifying said sharp laser pulse prior to impingement against said target.

10. A method of laser shock peening a target comprising the steps of:

pumping energy into a laser rod;

oscillating a coherent beam through the laser rod in an oscillator such that the coherent beam is amplified to a peak by the energy pumped into the laser rod;

switching a Pockels cell to change a degree of wave retardation of the coherent beam and dump the coherent beam out of the oscillator as a laser pulse;

selecting a switching time of the Pockels cell to control a rise time of the laser pulse; and directing the laser pulse against a target, wherein the laser pulse is directed against the target without reducing a duration of the rise time of the laser pulse.

11. The method of claim 10, wherein the Pockels cell is switched in less than or equal to about 3 nanoseconds such that the rise time of the laser pulse is less than or equal to about 3 nanoseconds.

12. The method of claim 10, wherein the laser pulse has a trailing edge of less than or equal to about 3 nanoseconds.

13. The method of claim 10, wherein substantially all the energy of the laser pulse is transmitted to the target.

14. The method of claim 10, wherein the Pockels cell is switched to a non-zero voltage bias to partially dump energy in the oscillator.

15. The method of claim 10, wherein the oscillator comprises first and second mirrors, and the method further comprises the step of selecting a distance between the first and second mirrors to achieve a desired width of the laser pulse.

16. The method of claim 15, wherein the laser pulse has a duration which is about equal to a round trip travel time of the coherent beam between the first and second mirrors.

17. The method of claim 15, wherein substantially all the energy pumped into the laser rod is removed from the oscillator within a round trip travel time of the coherent beam between the first and second mirrors.

* * * * *